(12) United States Patent
Lee et al.

(10) Patent No.: US 10,069,298 B2
(45) Date of Patent: Sep. 4, 2018

(54) INVERTER AND CONTROL METHOD THEREOF

(71) Applicant: DELTA ELECTRONICS, INC., Taoyuan (TW)

(72) Inventors: Wen-Chang Lee, Taoyuan (TW);
Yi-Hua Chang, Taoyuan (TW);
Chun-Ta Lin, Taoyuan (TW);
Chien-Hung Liu, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 182 days.

(21) Appl. No.: 15/270,003

(22) Filed: Sep. 20, 2016

(65) Prior Publication Data

US 2017/0201096 A1 Jul. 13, 2017

(30) Foreign Application Priority Data

Jan. 11, 2016 (TW) .............................. 105100646 A

(51) Int. Cl.
*H02J 3/00* (2006.01)
*H02M 7/44* (2006.01)
*H02M 1/44* (2007.01)

(52) U.S. Cl.
CPC ................. *H02J 3/00* (2013.01); *H02M 1/44* (2013.01); *H02M 7/44* (2013.01)

(58) Field of Classification Search
CPC ............... H02J 3/00; H02M 7/44; H02M 1/44
See application file for complete search history.

(56) References Cited

U.S. PATENT DOCUMENTS

| 2006/0138867 | A1 | 6/2006 | Tian et al. |
| 2012/0146587 | A1 | 6/2012 | Srinivasan et al. |

*Primary Examiner* — Robert Deberadinis
(74) *Attorney, Agent, or Firm* — CKC & Partners Co., Ltd.

(57) ABSTRACT

An inverter and a control method are disclosed herein. The inverter includes a first switching circuit, a second switching circuit, and a DC-AC converting circuit. The first switching circuit is configured to selectively switch between connecting a first input terminal receiving an AC source and an output terminal of the inverter, and connecting a second input terminal receiving a DC source and the output terminal of the inverter. The second switching circuit is configured such that the first input terminal and the output terminal are connected during the switching process of the first switching circuit. The DC-AC converting circuit is electrically coupled between the second input terminal and the first switching circuit and configured to be operated in a current control mode to convert the DC source to AC power when the first switching circuit is switched to connect the second input terminal and the output terminal.

20 Claims, 6 Drawing Sheets

INVERTER AND CONTROL METHOD THEREOF

RELATED APPLICATIONS

This application claims priority to Taiwan Application Serial Number 105100646, filed Jan. 11, 2016, which is herein incorporated by reference.

BACKGROUND

Technical Field

The present disclosure relates to a power electronic device, and in particular, to an inverter device.

Description of Related Art

In the operation of current inverters, due to the inherent delay characteristics of switches interruption in the output voltage and waveform fluctuation result, such that it is not possible to maintain a stable power supply quality.

Therefore, an important area of research in the field involves ways in which to improve the inverter, such that the inverter may maintain a consistent waveform in the output voltage during switching between an ordinary power supply and a backup power supply, and an undesired effect to the load side caused by an unstable power supply is prevented.

SUMMARY

One aspect of the present disclosure is an inverter. The inverter includes a first switching circuit, which is configured to selectively switch between connecting a first input terminal and an output terminal of the inverter, and connecting a second input terminal and the output terminal of the inverter, in which the first input terminal is configured to receive an AC source and the second input terminal is configured to receive a DC source; a second switching circuit, which is configured such that the first input terminal and the output terminal are connected during the switching process of the first switching circuit; and a DC-AC converting circuit, which is electrically coupled between the second input terminal and the first switching circuit and configured to be operated in a current control mode to convert the DC source to AC power when the first switching circuit is switched to connect the second input terminal and the output terminal.

Another aspect of the present disclosure is an inverter. The inverter includes a first switching circuit, which is configured to conduct a first branch of the inverter in a first mode of the inverter to receive an AC source from a first input terminal of the inverter and output the AC source to an output terminal of the inverter, and conduct a second branch of the inverter in a second mode of the inverter; a second switching circuit, which is configured to conduct the first branch of the inverter when the inverter is switching between the first mode and the second mode; and a DC-AC converter, which is arranged in the second branch and configured to be operated in a current control mode to receive a DC source from a second input terminal of the inverter and output an output current to the output terminal when the inverter is switching from the first mode to the second mode.

Yet another aspect of the present disclosure is a control method for an inverter. The inverter includes a first switching circuit, a second switching circuit, a DC-AC converting circuit and a processing circuit. The control method includes connecting, by the first switching circuit, a first input terminal and an output terminal of the inverter; when the processing circuit outputs a first switching signal, connecting, by the second switching circuit, the first input terminal and the output terminal, and connecting, by the first switching circuit, a second input terminal and the output terminal of the inverter; outputting, by the processing circuit, a first control signal to the DC-AC converting circuit to control the DC-AC converting circuit to be operated in a current control mode and output an output current to the output terminal; and switching off the second switching circuit when the processing circuit outputs a switch-off signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
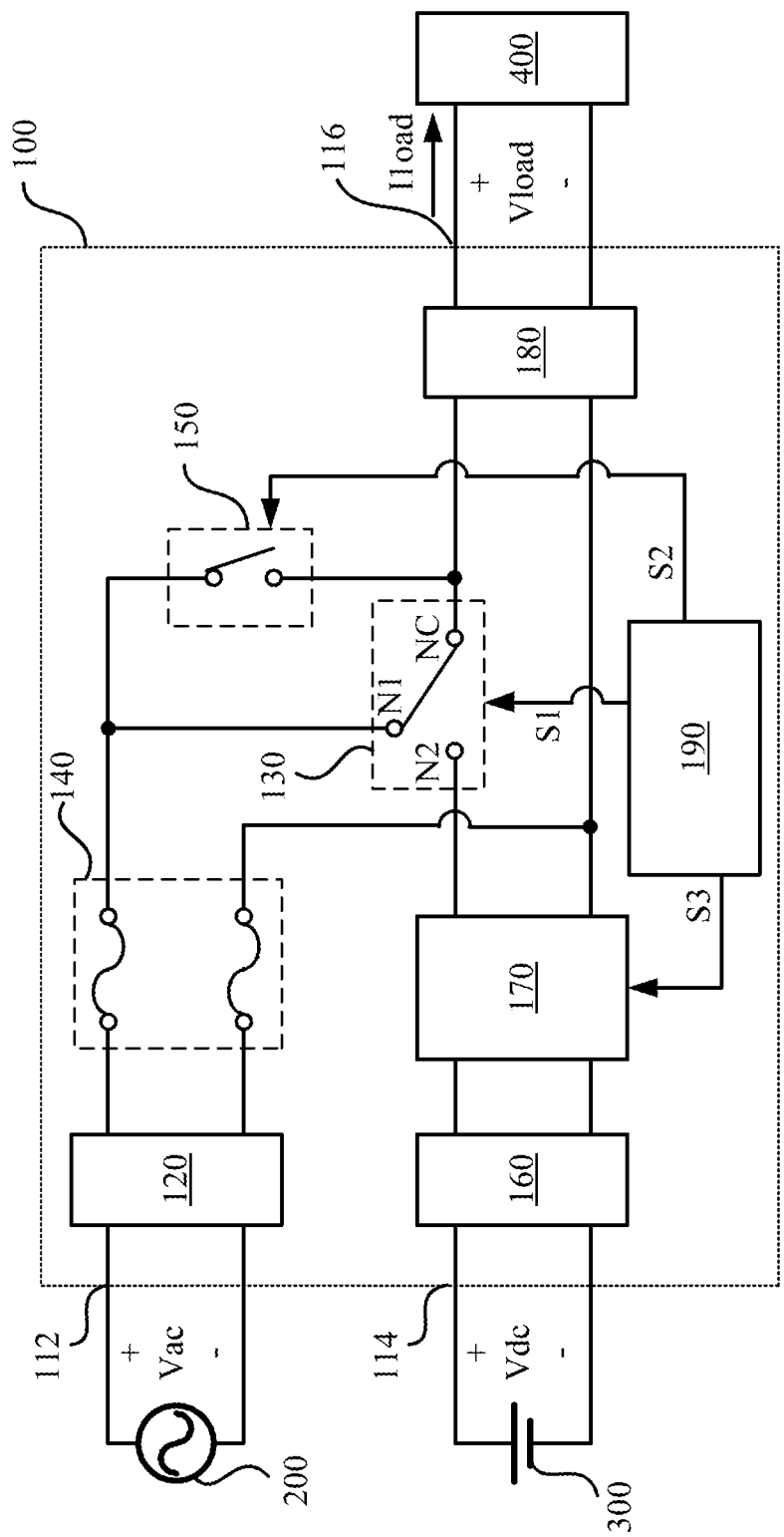
FIG. 1 is a diagram illustrating an inverter according to an embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating an inverter 100 according to an embodiment of the present disclosure. As illustratively shown in FIG. 1, the inverter 100 includes switching circuits 130 and 150, a DC-AC converting circuit 170 and a processing circuit 190. In some embodiments, the switching circuits 130 and 150 are different types of switches. In some embodiments, the conduction loss of the switching circuit 130 is smaller than the conduction loss of the switching circuit 150, and the switching delay of the switching circuit 150 is smaller than the switching delay of the switching circuit 130. For example, the switching circuit 130 may include a relay or other switching elements with a low conduction loss. The switching circuit 150 may include a semiconductor switching element, such as a silicon controlled rectifier (SCR), an insulated gate bipolar transistor (IGBT), a metal oxide semiconductor field effect transistor (MOSFET), or other switching elements that are able to be instantaneously turned on. It is noted that the types of the switching elements mentioned above are merely examples and not meant to limit the present disclosure.

The inverter 100 includes a first input terminal 112, a second input terminal 114 and an output terminal 116. The first input terminal 112 is configured to receive an AC voltage Vac from a power source 200, the second input terminal 114 is configured to receive a DC voltage Vdc from a power source 300, and the output terminal 116 is configured to provide an output voltage Vload and an output current Iload to a load 400. In some embodiments, the power source 200 and the power source 300 are independent of each other. For example, the power source 200 may be AC power connected to a power grid, and the power source 300 may be a DC power source provided by a battery.

In some embodiments, the switching circuit 130 is configured to selectively switch between connecting the first input terminal 112 and the output terminal 116 of the inverter 100, and connecting the second input terminal 114 and the output terminal 116 of the inverter 100. As illustratively shown in FIG. 1, the first contact node N1 of the switching circuit 130 is electrically coupled to the first input terminal 112, the second contact node N2 of the switching circuit 130 is electrically coupled to the second input terminal 114, and the common contact node NC of the switching circuit 130 is electrically coupled to the output terminal 116. When a control signal S1 outputted by the processing circuit 190 controls the common contact node NC to be closed to the first contact node N1 of the switching circuit 130 and opened to the second contact node N2 of the switching circuit 130, the switching circuit 130 connects the first input terminal 112 and the output terminal 116 of the inverter 100. On the other hand, when the control signal S1 outputted by the processing circuit 190 controls the common contact node NC to be opened to the first contact node N1 of the switching circuit 130 and closed to the second contact node N2 of the switching circuit 130, the switching circuit 130 connects the second input terminal 114 and the output terminal 116 of the inverter 100.

The switching circuit 150 is electrically coupled between the first input terminal 112 and the output terminal 116, and configured such that the first input terminal 112 and the output terminal 116 are connected during the switching process of the switching circuit 130. The ON and OFF of the switching circuit 150 may be controlled by a control signal S2 outputted by the processing circuit 190.

The DC-AC converting circuit 170 is electrically coupled between the second input terminal 114 and the second contact node N2 of the switching circuit 130, and configured to receive the DC power provided by the power source 300 from the second input terminal 114, and convert the DC power to AC power. Specifically, the DC-AC converting circuit 170 may be controlled by a control signal S3 outputted by the processing circuit 190, and operated correspondingly in a voltage control mode or a current control mode, in order to control the output voltage or the output current outputted by the DC-AC converting circuit 170. In some embodiments, the control signal S3 may be a pulse width modulation (PWM) signal and control the output of the DC-AC converting circuit 170 by adjusting the duty cycle. It is noted that the DC-AC converting circuit 170 may be implemented by various switching power supply circuits, such as a full-bridge inverter, a half-bridge inverter, etc., but the present disclosure is not limited thereto.

The processing circuit 190 is electrically coupled to the switching circuits 130 and 150, and the DC-AC converting circuit 170, and configured to output the control signals S1, S2 and S3 respectively to control the switching of the switching circuit 130, the switching of the switching circuit 150, and the output voltage and output current of the DC-AC converting circuit 170. Thus, by the processing circuit 190 controlling the ON and OFF of the switching circuit 150, it is ensured that the inverter 100 may provide the output voltage Vload to the load 400 stably during the switching of the switching circuit 130. In some embodiments, the processing circuit 190 may further maintain the amplitude and the phase of the output voltage Vload by controlling the output of the DC-AC converting circuit 170, and details with respect to the control method and strategy will be discussed and explained in the following paragraphs in accordance with the related drawings.

In some embodiments, the inverter 100 may include elements such as electromagnetic filtering circuits 120, 160 and 180 and an overcurrent protecting circuit 140 to maintain the stability of the output voltage Vload and the safety of the components in the inverter 100. As illustratively shown in FIG. 1, the electromagnetic filtering circuit 120 is electrically coupled to the first input terminal 112 and may be configured to filter the noise in the power source 200. The electromagnetic filtering circuit 160 is electrically coupled to the second input terminal 114 and may be configured to filter the noise in the power source 300. The electromagnetic filtering circuit 180 is electrically coupled to the output terminal 116 and may be configured to filter the noise in the output voltage Vload outputted via the switching circuit 130 or the switching circuit 150 to the output terminal 116. The overcurrent protecting circuit 140 may be a fuse or another non-fuse breaker, which is electrically coupled between the electromagnetic filtering circuit 120 and the switching circuits 130 and 150. When the current flowing from the power source 200 to the inverter 100 is too large due to a malfunction or a power grid failure, the overcurrent protecting circuit 140 may switch off the power source to prevent the inner components from breaking.

Figure 2:
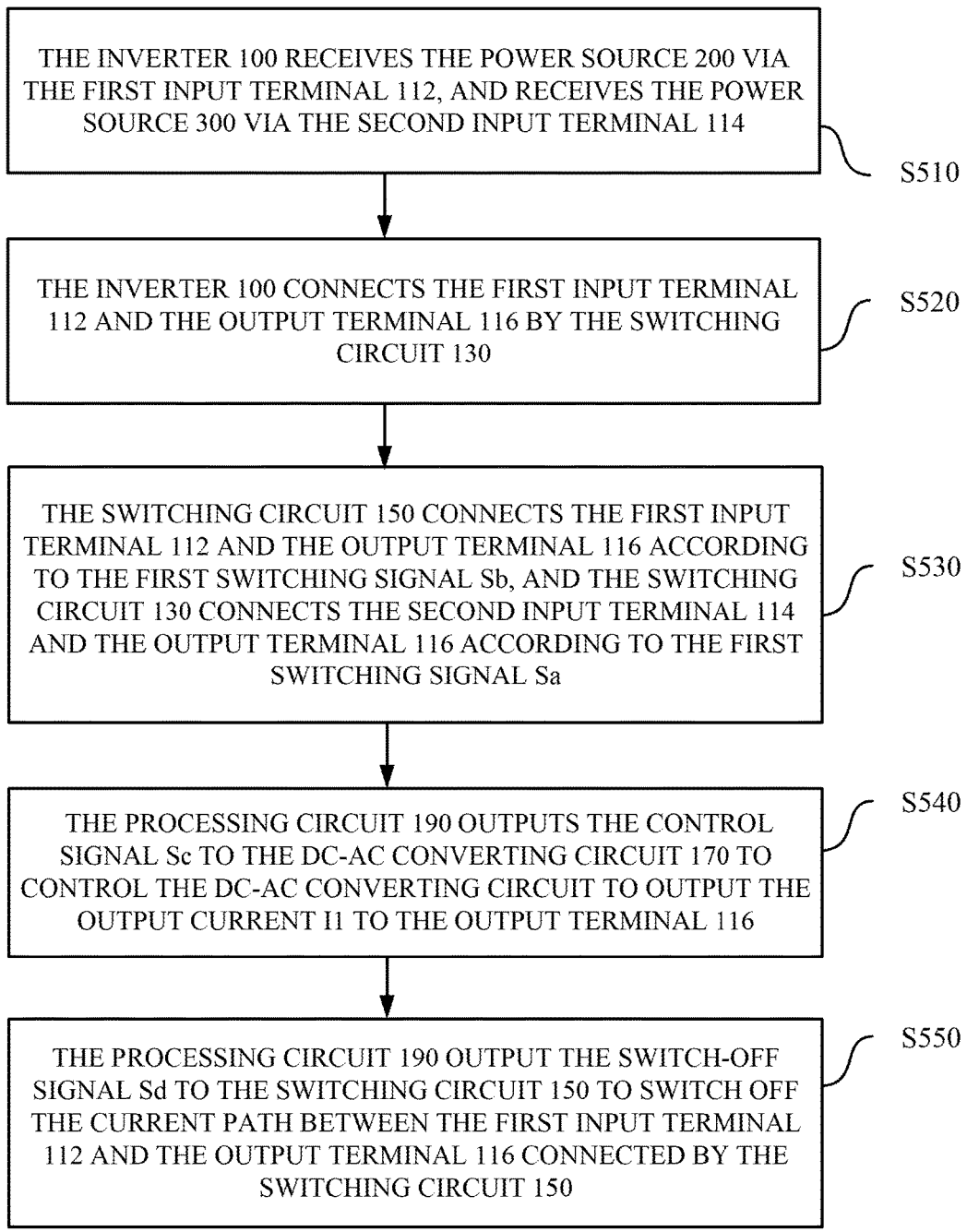
FIG. 2 is a flowchart illustrating a control method of the inverter shown in FIG. 1 according to an embodiment of the present disclosure.

Reference is made to FIG. 2. FIG. 2 is a flowchart illustrating a control method 500 of the inverter 100 shown in FIG. 1 according to an embodiment of the present disclosure. For better understanding of the present disclosure, the control method 500 shown in FIG. 2 is discussed in relation to FIG. 3 to FIG. 6. FIG. 3 to FIG. 6 are diagrams illustrating the operation of the control method 500 shown in FIG. 2 according to an embodiment of the present disclosure.

As shown in FIG. 2, the control method 500 includes steps S510, S520, 3530, S540, and S550. First, in step S510, the inverter 100 receives the power source 200 via the first input terminal 112, and receives the power source 300 via the second input terminal 114. In some embodiments, the power source 200 is an AC source, and the power source 300 is a DC source. For example, the power source 200 may be a 110 VAC or 220 VAC electric grid power supply, and the power source 300 may be a battery independent of the electric grid power supply.

Figure 3:
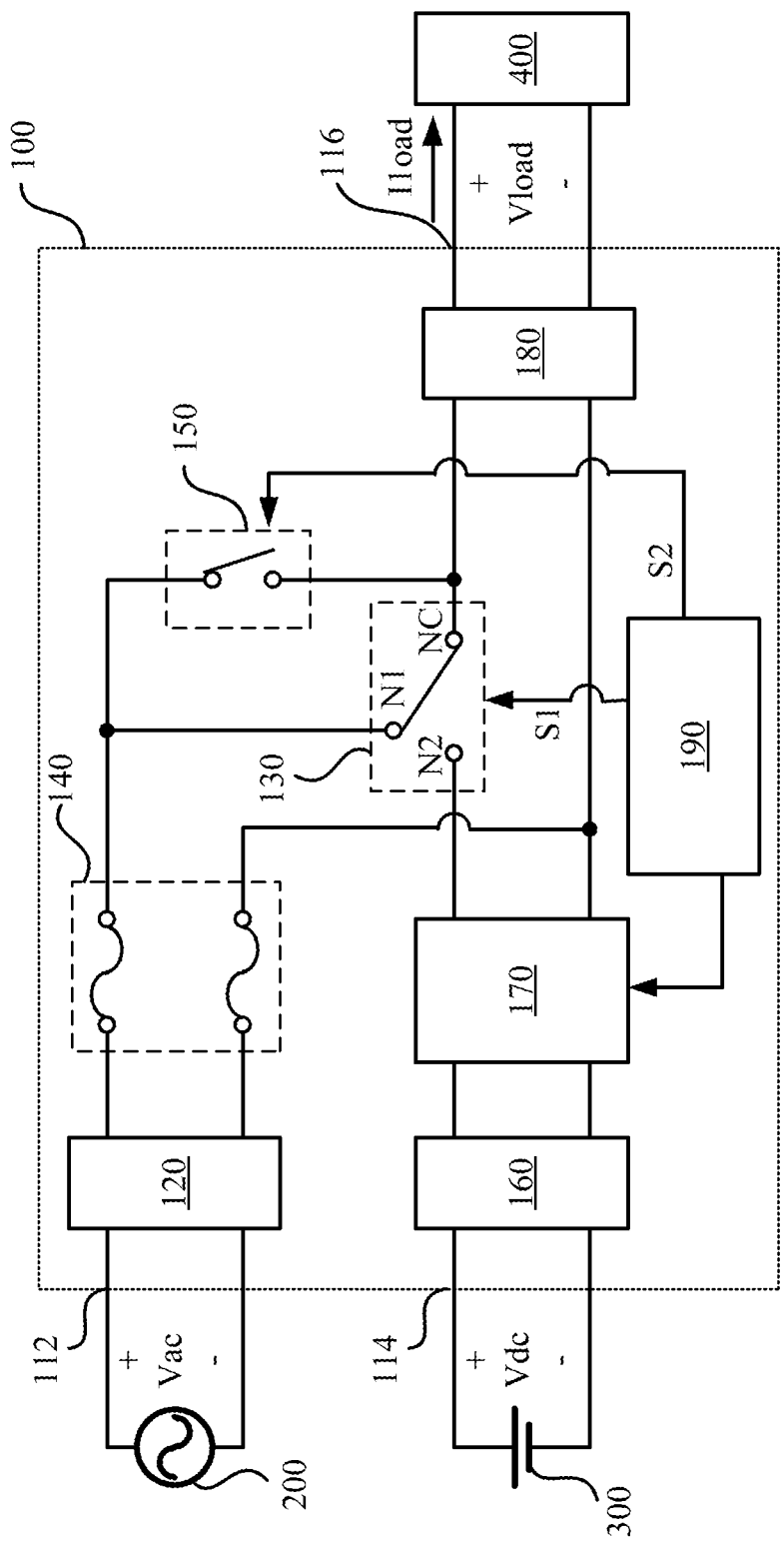
FIG. 3 to FIG. 6 are diagrams illustrating the operation of the control method shown in FIG. 2 according to an embodiment of the present disclosure.

Next, in step S520, as shown in FIG. 3, the inverter 100 connects the first input terminal 112 and the output terminal 116 by the switching circuit 130. The processing circuit 190 outputs corresponding control signals S1 and S2 to respectively control the switching circuit 130 to connect the first contact node N1 and the common contact node NC, and the switching circuit 150 to switch off.

Alternatively stated, at this time, the inverter 100 is operated in a power grid supplying mode, and the inverter 100 conducts the first branch connecting the first input terminal 112 and the output terminal 116 such that the inverter 100 receives the AC voltage Vac of the power source 200 from the first input terminal 112, and outputs the power supplied by the power source 200 to the output terminal 116 to provide the output voltage Vload to the load 400.

Figure 4:
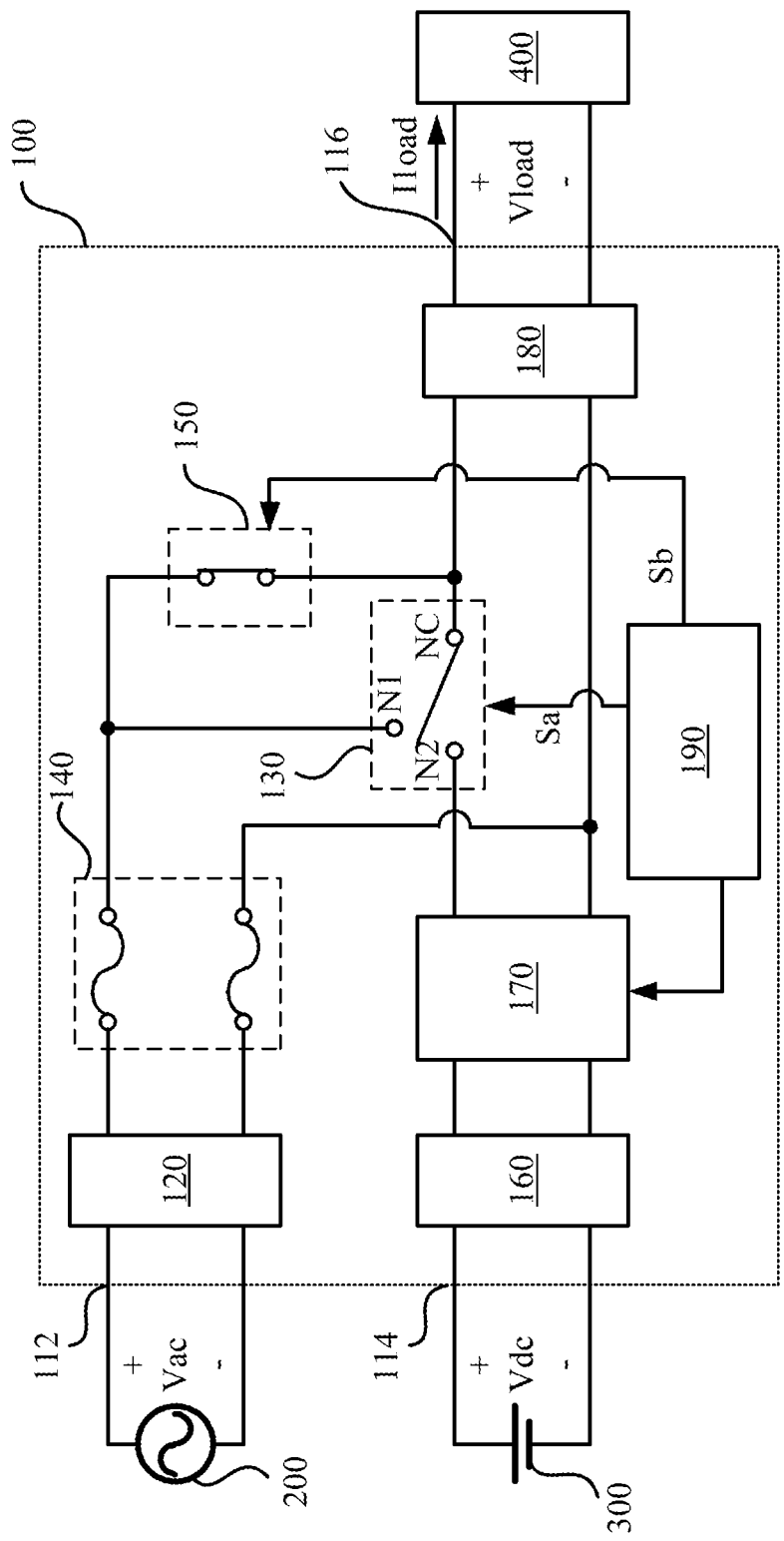

Next, in step S530, as illustratively shown in FIG. 4, the processing circuit 190 outputs the first switching signals Sa and Sb. When the processing circuit 190 outputs the first switching signals Sa and Sb, the inverter 100 switches from the power grid supplying mode to an inverter supplying mode. At this time, the switching circuit 150 connects the first input terminal 112 and the output terminal 116 (i.e., the switching circuit 150 conducts the first branch) according to the first switching signal Sb, and the switching circuit 130 conducts a second branch connecting the second input terminal 114 and the output terminal 116 according to the first switching signal Sa. It is noted that, in some embodiments, the processing circuit 190 may apply the same outputted signal as the first switching signal Sa to the switching circuit 130 and at the same time as the first switching signal Sb to the switching circuit 150. In some embodiments, the processing circuit 190 may also output outputted signals to the switching circuit 130 and the switching circuit 150 different from the first switching signals Sa and Sb respectively. The example shown in the drawings is only a possible embodiment of the present disclosure and not meant to limit the present disclosure.

As illustratively shown in FIG. 4, in some embodiments, since the switching circuit 130 is a relay or switching components with a low conduction loss, a delay time is present between the start of the switching (i.e., switching off of the first contact node N1 and the common contact node NC) and the completion of the switching (i.e., switching on of the second contact node N2 and the common contact node NC) of the switching circuit 130. During the delay time, the switching circuit 150, which has a short switching delay, has been instantaneously turned on, and thus the inverter 100 may receive the AC voltage Vac from the power source 200 via the switching circuit 150 and provide the output voltage Vload to the load 400.

Figure 5:
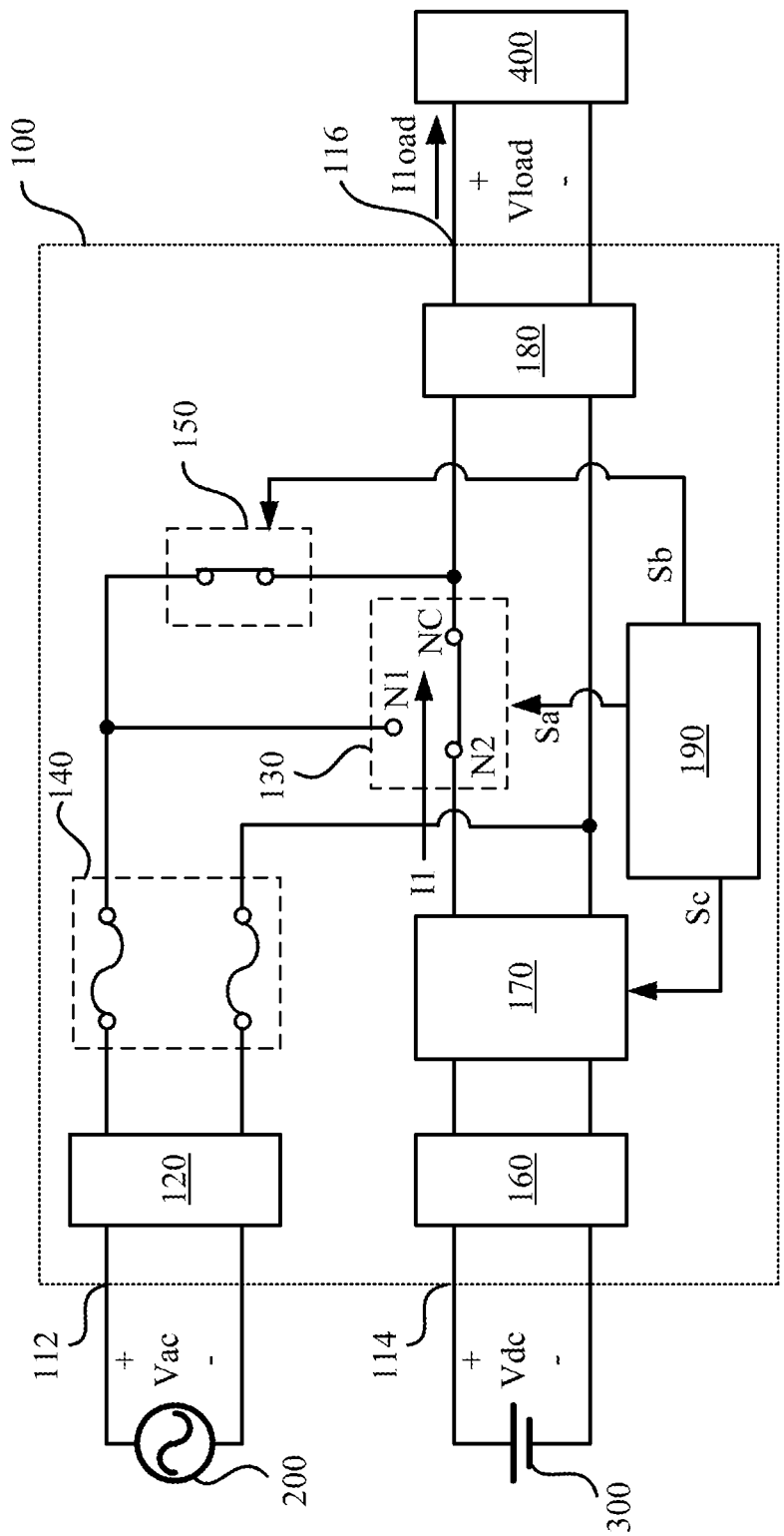
Figure 6:
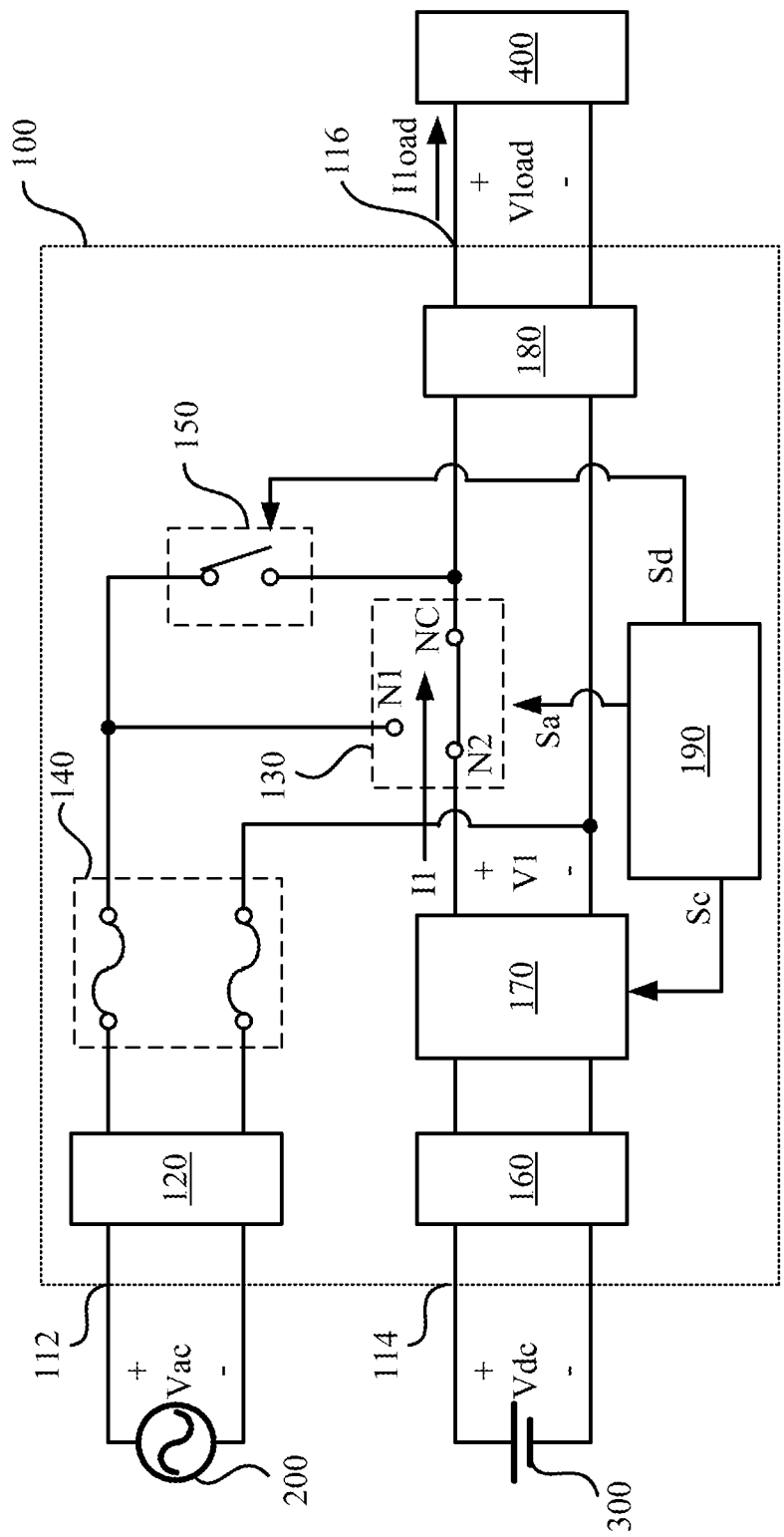

As illustratively shown in FIG. 5, when the switching of the switching circuit 130 is completed, the switching circuit 130 connects the second input terminal 114 and the output terminal 116, and the switching circuit 150 stays ON. Next, in step S540, the processing circuit 190 outputs the control signal Sc to the DC-AC converting circuit 170 to control the DC-AC converting circuit 170 to output the output current I1 to the output terminal 116. Specifically, the control signal Sc corresponds to the current commands calculated in the processing circuit 190. When the switching circuit 150 is ON, the output voltage Vload is determined by the power source 200. Thus, the control signal Sc of the processing circuit 190 controls the DC-AC converting circuit 170 in the second branch to be operated in the current control mode, and increases the current command from zero to match the output current Iload. Thus, the output current I1 of the DC-AC converting circuit 170 may be controlled by the control signal Sc and follow the current command increasing from zero to a target value. Alternatively stated, the output current I1 may increase according to the control of the control signal Sc, until the output current load required by the load 400 is totally provided by the DC-AC converting circuit 170.

Finally, step S550 is performed. As illustratively shown in FIG. 6, since the output current I1 and the output current Iload are equal, and the power source 300 provides the power required by the loads directly, the processing circuit 190 outputs the switch-off signal Sd to the switching circuit 150 to switch off the current path between the first input terminal 112 and the output terminal 116 connected by the switching circuit 150. In some embodiments, the processing circuit 190 is configured to output the switch-off signal Sd at a zero-crossing point of the power source 200 to switch off the switching circuit 150, so as to lower the disturbance on the output voltage Vload caused by the operation of the switches. In some embodiments, after the processing circuit 190 outputs the switch-off signal Sd, the output voltage Vload may be controlled by the DC-AC converting circuit 170. Thus, the processing circuit 190 may output the control signal Sc to the DC-AC converting circuit 170 to control the DC-AC converting circuit 170 operated in the current control mode switching to the voltage control mode, and control the amplitude of the voltage V1 outputted by the DC-AC converting circuit 170 correspondingly.

In some embodiments, the processing circuit 190 may output a second switching signal Sc such that the inverter 100 switches from the inverter supplying mode to the power grid supplying mode. Specifically, the second switching signal Sc of the processing circuit 190 controls the DC-AC converting circuit 170 in the second branch to be operated in the voltage control mode, such that the DC-AC converting circuit 170 is synchronized with the power source 200 (e.g., power grid) by the phase-locked loop circuit. Thus, the processing circuit 190 may output the switching signals Sa and Sb at the zero-crossing points of the power source 200 to turn on the switching circuits 130 and 150 respectively. Accordingly, the switching circuit 150 may perform soft switching at the zero-crossing point and conduct the first input terminal 112 and the output terminal 116 (i.e., the first branch). When the first branch is conducted, the inverter 100 provides the output current Iload from the power source 200. When the switching circuit 130, which has a longer switching delay than the switching circuit 150, completes switching, the current may be outputted from the first input terminal 112 to the output terminal 116 via the switching circuit 130, and the processing circuit 190 may output the switch-off signal Sd at this time to switch off the switching circuit 150 to reduce the conduction loss. Similarly, in some embodiments, the processing circuit 190 is configured to output the switch-off signal Sd at the zero-crossing point of the power source 200 to switch off the switching circuit 150 so as to lower the disturbance on the output voltage Vload caused by the operation of the switches.

Compared to the DC-AC converting circuit 170 operating in the current control mode to ensure that the output current Iload provided by the power source 200 is transferred to the output current Iload provided by the power source 300 when switching from the power grid supplying mode to the inverter supplying mode, when the inverter 100 is switched from the inverter supplying mode to the power grid supplying mode, the DC-AC converting circuit 170 may be operated in the voltage control mode. Alternatively stated, in some embodiments, the DC-AC converting circuit 170 is operated in different control modes in two switching processes respectively, such that the inverter 100 maintains a stable output during the switching processes. Since details of the switching steps are similar to those when the inverter 100 is switched from the power grid supplying mode to the inverter supplying mode, and one of ordinary skill in the art can understand how the inverter 100 is switched from the inverter supplying mode to the power grid supplying mode based on steps S510~S550 in the aforementioned embodiments, a further explanation in this regard is omitted herein for the sake of brevity.

Those skilled in the art can readily understand how to perform the operations and functions of the control method 500 based on the inverter 100 in the various embodiments described above, and thus a further explanation is omitted herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

In the aforementioned embodiments, the processing circuit 190 may be implemented in various ways, such as using a microcontroller unit (MCU), a Complex Programmable Logic Device (CPLD), a Field-Programmable Gate Array (FPGA), etc. The electromagnetic filtering circuits 120, 160, and 180, the overcurrent protecting circuit 140, and the DC-AC converting circuit 170 may also be implemented using suitable power electronic components.

In summary, in the present disclosure, by applying the embodiments described above, when the switching circuit 130 having a long switching delay is switching between conducting the first branch and conducting the second branch, the inverter 100 may maintain a stable output by turning on the switching circuit 150 immediately. Since the switching circuit 150 conducts the first branch, the time at which the switching circuit 130 disconnects the first branch is not limited by the zero-crossing point of the power source 200. When the switching circuit 130 conducts the second branch, the output current I1 of the DC-AC converting circuit 170 may increase gradually by the control of the processing circuit 190, such that the power source 300 replaces the power source 200 as the power supply of the load 400, so as to keep the waveform and the phase of the output voltage Vout continuous and improve the quality of the power supply. As a result, unstableness of the output voltage in a transient state, such as waveform fluctuation or voltage interruption, is avoided. Thus, the inverter 100 may be applied to the load 400 having strict power supply quality requirements.

In addition, after the switching of the switching circuit 130, the switching circuit 150 may be switched off at a proper point in time. Alternatively stated, the switching circuit 150 may only be turned ON in the transient state and thus a larger conduction loss due to current flowing into the switching circuit 150 is avoided in the steady state. Furthermore, the choice of the switching circuit 150 may be such that only a short period transient withstand current is taken into consideration, since the switching circuit 150 is not required to be ON during the whole operation of the inverter 100, and the rating of the component may be lower to achieve a reduction in component costs and smaller volume size of the components. In some applications, since the conduction loss generated by the switching circuit 130 is lower in the steady state, the efficiency of the inverter 100 is improved and heat dissipation issues resulting from high conduction loss are avoided.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An inverter, comprising:
   a first switching circuit, configured to selectively switch between connecting a first input terminal and an output terminal of the inverter, and connecting a second input terminal and the output terminal of the inverter, wherein the first input terminal is configured to receive an AC source and the second input terminal is configured to receive a DC source;
   a second switching circuit, configured such that the first input terminal and the output terminal are connected during the switching process of the first switching circuit; and
   a DC-AC converting circuit, electrically coupled between the second input terminal and the first switching circuit and configured to be operated in a current control mode to convert the DC source to AC power when the first switching circuit is switched to connect the second input terminal and the output terminal.

2. The inverter of claim 1, wherein the DC-AC converting circuit is further configured to be operated in a voltage control mode to convert the DC source to AC power when the first switching circuit is switched to connect the first input terminal and the output terminal.

3. The inverter of claim 1, further comprising:
   a processing circuit, configured to output a processing signal to the DC-AC converting circuit to control an output current, which is outputted by the DC-AC converting circuit to the output terminal in the current control mode, to increase from zero to a target value.

4. The inverter of claim 1, further comprising:
   a processing circuit configured to output a switching signal to the second switching circuit, wherein when the second switching circuit receives the switching signal, the second switching circuit connects the first input terminal and the output terminal.

5. The inverter of claim 4, wherein the processing circuit is further configured to output the switching signal to the first switching circuit, wherein when the first switching circuit receives the switching signal, the first switching circuit connects the second input terminal and the output terminal.

6. The inverter of claim 1, further comprising:
a processing circuit configured to output a switch-off signal to the second switching circuit, wherein when the second switching circuit receives the switch-off signal, the second switching circuit switches off the first input terminal and the output terminal.

7. The inverter of claim 6, wherein the processing circuit is configured to output the switch-off signal at a zero-crossing point of the AC source.

8. The inverter of claim 1, wherein the AC source is independent of the DC source.

9. The inverter of claim 1, wherein the conduction loss of the first switching circuit is smaller than the second switching circuit, and the switching delay of the second switching circuit is smaller than the first switching circuit.

10. An inverter, comprising:
a first switching circuit, configured to conduct a first branch of the inverter in a first mode of the inverter to receive an AC source from a first input terminal of the inverter and output the AC source to an output terminal of the inverter, and conduct a second branch of the inverter in a second mode of the inverter;
a second switching circuit, configured to conduct the first branch of the inverter when the inverter is switching between the first mode and the second mode; and
a DC-AC converter arranged in the second branch and configured to be operated in a current control mode to receive a DC source from a second input terminal of the inverter and output an output current to the output terminal when the inverter is switching from the first mode to the second mode.

11. The inverter of claim 10, further comprising a processing circuit configured to output a switching signal to the first switching circuit and the second switching circuit, wherein the inverter switches between the first mode and the second mode according to the switching signal.

12. The inverter of claim 11, wherein when the inverter is switching from the second mode to the first mode, the processing circuit controls the second switching circuit to conduct the first branch at a zero-crossing point of the AC source.

13. The inverter of claim 11, wherein when the inverter is switching from the second mode to the first mode, the processing circuit controls the DC-AC converter operated in a voltage control mode to synchronize with the AC source.

14. The inverter of claim 11, wherein the processing circuit is further configured to output a switch-off signal to the second switching circuit, and the second switching circuit is configured to be switched off according to the switch-off signal.

15. A control method of an inverter, wherein the inverter comprises a first switching circuit, a second switching circuit, a DC-AC converting circuit and a processing circuit, the control method comprising:
connecting, by the first switching circuit, a first input terminal and an output terminal of the inverter;
when the processing circuit outputs a first switching signal, connecting, by the second switching circuit, the first input terminal and the output terminal, and connecting, by the first switching circuit, a second input terminal and the output terminal of the inverter;
outputting, by the processing circuit, a first control signal to the DC-AC converting circuit to control the DC-AC converting circuit to be operated in a current control mode and output an output current to the output terminal; and
switching off the second switching circuit when the processing circuit outputs a switch-off signal.

16. The control method of claim 15, further comprising:
receiving a first power source from the first input terminal; and
receiving a second power source from the second input terminal,
wherein the first power source and the second power source are independent of each other, the first power source is an AC source, and the second power source is a DC source.

17. The control method of claim 16, wherein the processing circuit outputs the switch-off signal at a zero-crossing point of the first power source.

18. The control method of claim 15, further comprising:
when the processing circuit outputs a second switching signal, connecting, by the second switching circuit, the first input terminal and the output terminal, and connecting, by the first switching circuit, the first input terminal and the output terminal; and
switching off the second switching circuit when the processing circuit outputs a switch-off signal.

19. The control method of claim 18, wherein the processing circuit outputs the second switching signal at a zero-crossing point of the first power source.

20. The control method of claim 18, further comprising:
outputting, by the processing circuit, a second control signal to the DC-AC converting circuit to control the DC-AC converting circuit to be operated in a voltage control mode to synchronize with the first power source.

* * * * *